US006681199B2

(12) United States Patent
Imai et al.

(10) Patent No.: US 6,681,199 B2
(45) Date of Patent: Jan. 20, 2004

(54) PEAK TIME DETECTING APPARATUS AND METHOD

(75) Inventors: Katsuji Imai, Nagoya (JP); Motomi Iyoda, Seto (JP); Masuji Oshima, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 319 days.

(21) Appl. No.: 09/796,802

(22) Filed: Mar. 2, 2001

(65) Prior Publication Data
US 2002/0152054 A1 Oct. 17, 2002

(51) Int. Cl.[7] .............................................. G06F 15/00
(52) U.S. Cl. .......................... 702/189; 702/190; 702/1; 702/14; 702/16; 702/17; 702/191; 702/6; 702/35; 702/66; 702/85; 600/410; 600/431; 600/437; 600/500; 600/509; 382/236; 382/232; 382/100; 382/103; 382/240; 382/248; 367/31; 367/39; 367/53; 367/63; 367/72
(58) Field of Search ................................. 702/189, 190, 702/1, 14, 16, 17, 191, 6, 35, 66, 85; 600/410, 431, 437, 500, 509; 382/236, 232, 100, 103, 290, 296; 367/72, 53, 63, 39, 31

(56) References Cited

U.S. PATENT DOCUMENTS

| 4,599,567 | A | * | 7/1986 | Goupillaud et al. ...... 324/76.33 |
| 5,517,585 | A | * | 5/1996 | Dowling ..................... 382/291 |
| 5,764,805 | A | * | 6/1998 | Martucci et al. ............ 382/238 |
| 5,967,548 | A | | 10/1999 | Kozyreff |
| 6,073,100 | A | * | 6/2000 | Goodridge, Jr. ............ 704/258 |
| 6,157,880 | A | | 12/2000 | De Mersseman et al. |
| 6,170,864 | B1 | | 1/2001 | Fujita et al. |
| 6,196,578 | B1 | | 3/2001 | Iyoda |
| 6,198,997 | B1 | | 3/2001 | Ishikawa et al. |
| 6,236,921 | B1 | | 5/2001 | McConnell |
| 6,347,268 | B1 | | 2/2002 | Fujita et al. |
| 6,371,515 | B1 | | 4/2002 | Fujishima et al. |
| 6,426,567 | B2 | | 7/2002 | Ugusa et al. |
| 6,430,489 | B1 | | 8/2002 | Dalum |

FOREIGN PATENT DOCUMENTS

| DE | 196 11 973 | | 10/1996 | |
| DE | 197 13 087 | | 11/1997 | |
| DE | 697 00 087 | | 7/1999 | |
| JP | 8-258665 | | 10/1996 | |
| JP | 9-315265 | | 12/1997 | |
| JP | 10-067295 | | 3/1998 | |
| JP | 10-152014 | | 6/1998 | |
| JP | 411122316 | * | 4/1999 | ......... H04L/27/227 |

* cited by examiner

Primary Examiner—John Barlow
Assistant Examiner—Aditya Bhat
(74) Attorney, Agent, or Firm—Kenyon & Kenyon

(57) ABSTRACT

A product-sum operation portion for performing a product-sum operation (wavelet transformation) with respect to an input time-series signal by using as a base of integral a complex function in which the imaginary number portion is $\pi/2$ shifted in phase from the real number portion, a phase calculation portion for calculating a phase $\theta$ from the ratio between the real number portion and the imaginary number portion of a result of the product-sum operation, a peak time detection portion for detecting a time point at which the calculated phase $\theta$ changes from $2\pi$ to zero, as a peak time, are provided. Since the wavelet transformation is performed by using a basic wavelet function that is localized in terms of time and frequency, a peak time can be promptly detected. Furthermore, since a differential operation is not employed but the product-sum operation is performed, false detection caused by noises or the like can be prevented.

18 Claims, 10 Drawing Sheets

PEAK TIME DETECTING APPARATUS AND METHOD

BACKGROUND OF THE INVENTION

1. Field of the Invention

The present invention relates to a peak time detecting apparatus and a peak time detecting method and, more particularly, to a peak time detecting apparatus that detects a peak time of time-series signals by using the wavelet transformation and a peak time detecting method that detects a peak time of time-series signals inputted by using the wavelet transformation.

2. Description of the Related Art

Various peak time detecting methods of the aforementioned type have been proposed, including a method in which a differential coefficient is calculated with respect to input time-series signals and, based on fluctuations of the differential coefficient, a peak and a peak time are detected, a method in which a maximum value of input time-series signals is tracked, and the maximum value retained before the signal value decreases below a pre-set threshold is set as a peak value, and the time point of detection of the maximum value is detected as a peak time, etc.

However, in the method of detecting a peak time based on fluctuations of the differential coefficient, false detection by noises is likely to occur, and the reliability is low. In the method in which when an input time-series signal drops below a pre-set threshold, the time of detection of the current maximum value is set as a peak time, detection of a peak time cannot be performed until an input signal is less than the threshold, and therefore detection of a peak time requires an amount of time.

A first peak of signals from a deceleration sensor used to activate an occupant protection apparatus that protects occupants at the time of a crash of the vehicle, such as an airbag apparatus of the like, is normally found when a bumper reinforcement provided forward of side members of a vehicle yields to an impact. Input signals up to the proximity of the first peak are used to determine a form of crash (a frontal collision, a diagonal collision, an offset collision, etc.), or to determine a timing of activating an occupant protection apparatus and a kind of the activation of the occupant protection apparatus, although the situation may vary depending on the configuration of a vehicle. If a peak time is detected with respect to signals from the deceleration sensor used by the occupant protection apparatus, the detection precision and the promptness in detecting a peak time become important factors.

SUMMARY OF THE INVENTION

It is an object of the peak time detecting apparatus and the peak time detecting method of the invention to reduce the false detections cased by noises or the like so as to detect the peak time of signals that are more precisely inputted. It is another object of the peak time detecting apparatus and the peak time detecting method of the invention to promptly detect a peak time. Furthermore, it is an object of the peak time detecting apparatus of the invention to determine the validity of peak time detection.

In order to achieve at least one of the aforementioned objects, the peak time detecting apparatus and the peak time detecting method of the invention adopt the following means.

A peak time detecting apparatus in accordance with a first aspect of the invention is a peak time detecting apparatus peak time detecting apparatus for detecting a peak time of a time-series signal by using a wavelet transformation, including: signal input means for inputting the time-series signal; product-sum operation means for performing a product-sum operation with respect to the time-series signal inputted, by using a predetermined complex function as an integral base; phase calculation means for calculating a phase based on a real number portion and an imaginary number portion of a result of the product-sum operation; and peak time determination means for determining a peak time of the time-series signal based on the phase calculated.

In the peak time detecting apparatus of the first aspect of the invention, the product-sum operation means performs the product-sum operation with respect to the time-series signal inputted by the signal input means, by using a predetermined complex function as a base of integral. The phase calculation means calculates a phase based on the real number portion and the imaginary number portion of a result of the product-sum operation. The peak time determination means determines a peak time of the time-series signal based on the calculated phase. The wavelet transformation is excellent for the analysis of a time-series signal in a time region and a frequency region, in comparison with a short-time Fourier transformation. If a transformation frequency and waveforms of the real number portion and the imaginary number portion are suitably selected, the wavelet transformation allows analysis of a targeted signal. The peak time detecting apparatus of the first aspect detects a peak time of a time-series signal through the use of a signal analysis based on the wavelet transformation.

Since the peak time detecting apparatus of the first aspect performs the product-sum operation with respect to the input time-series signal by using the predetermined complex function, and does not perform a differential operation, the peak time detecting apparatus is able to avoid false detection based on noises. As a result, the detection precision can be improved. Furthermore, since the determination of a peak time is performed based on the phase calculated based on the real number portion and the imaginary number portion of a result of the product-sum operation, the determination can be made immediately after an actual peak. Therefore, the apparatus is able to detect a peak time quickly, in comparison with an apparatus that determines a peak time when the signal becomes lower than a pre-set threshold. Furthermore, the arithmetic operations performed in the apparatus are the product-sum operation with respect to the time-series signal, the phase calculation with respect to a result of the product-sum operation, etc, and can be quickly performed. Therefore, a peak time can be promptly detected.

In the peak time detecting apparatus of the first aspect of the invention, the product-sum operation means may be means that uses a Gabor function as the predetermined complex function. Furthermore, the product-sum operation means may also be means that uses, as the predetermined complex function, a function that includes a real number portion having a localized waveform and an imaginary number portion having a localized waveform that is delayed by $\pi/2$ in phase from the real number portion. In the thus-constructed peak time detecting apparatus of the invention, the peak time determination means may be means for determining, as the peak time, a time point at which the phase calculated by the phase calculation means changes from $2\pi$ to zero. If a function that has a real number portion having a localized waveform and an imaginary number portion having a localized waveform that is delayed by $\pi/2$ in phase from the real number portion, including the Gabor function, is used as a base of integral, the product sum of the real number portion becomes a positive value when the real number portion is superimposed on a peak of the signal. In that case, the imaginary number portion, being delayed by $\pi/2$ in phase, assumes zero, and therefore the product sum of the imaginary number portion is zero. Therefore, by suitably selecting signs of the real number portion and the imaginary number portion, it becomes possible to determine a time point at which the phase calculated based on the real number portion and the imaginary number portion of a result of the product-sum operation changes from $2\pi$ to zero, as a time at which the signal is at a peak.

The peak time detecting apparatus of the first aspect of the invention may further include validity determination means for determining a validity of a result of determination made by the peak time determination means. Therefore, the validity of the detected peak time can be taken into account. In the thus-constructed peak time detecting apparatus of the invention, the phase calculation means may be means for calculating a phase regarding a result of the product-sum operation with respect to a peak time detection-purposed transformation frequency and a phase regarding a result of the product-sum operation with respect to a validity determination-purposed transformation frequency that is higher than the peak time detection-purposed transformation frequency, and the validity determination means may be means for determining the validity based on the phase calculated regarding the result with respect to the validity determination-purposed transformation frequency. In the wavelet transformation, increases in the transformation frequency make it possible to detect peaks at higher frequencies in addition to a peak at a frequency intended for the signal. Therefore, the phase regarding a result of the product-sum operation using the validity determination-purposed transformation frequency that is higher than the peak time detection-purposed transformation frequency allows more sensitive peak detection than the phase regarding a result of the product-sum operation using the peak time detection-purposed transformation frequency. Therefore, by comparing the peak time detected through the use of the transformation frequency that allows more sensitive peak detection and the peak time determined by the peak time determination means, it is possible to determine the validity of the peak time determined by the peak time determination means. The determination of validity includes determination as to whether a peak time has gone without being detected, etc. In an example of such determination, if with regard to detection of a first peak time of a time-series signal, a peak is detected in the phase regarding a result of the product-sum operation using the validity determination-purposed transformation frequency whereas a corresponding peak is not detected and the time of a second peak is detected as a peak time in the phase regarding a result of the product-sum operation using the peak time detection-purposed transformation frequency, it is then determined that the determined peak time is uncertain as the first peak time in terms of validity, or is undetected. Still further, in the thus-constructed peak time detecting apparatus of the invention, the validity determination-purposed transformation frequency may be 1.0 to 2.0 times the peak time detection-purposed transformation frequency.

In the peak time detecting apparatus of the first aspect that includes the validity determination means, the validity determination means may be means for determining that a valid determination is made if a peak time is determined within a predetermined time before and after a time point at which the phase calculated regarding the result with respect to the validity determination-purposed transformation frequency changes from $2\pi$ to zero.

Still further, in the peak time detecting apparatus of the first aspect of the invention, the time-series signal may be a signal formed by removing a high-frequency component from a signal detected by deceleration detection means provided in a vehicle, and the phase calculation means may be means for calculating a phase regarding a result of the product-sum operation with respect to a predetermined transformation frequency within a range of 100 to 150 Hz. Therefore, it becomes possible to regard the deceleration of the vehicle as a time-series signal and detect a peak time of the signal.

A peak time detecting method in accordance with a second aspect of the invention is a peak time detecting method for detecting a peak time of an input time-series signal by using a wavelet transformation, including: performing a product-sum operation with respect to the input time-series signal by using a predetermined complex function as an integral base; calculating a phase based on a real number portion and an imaginary number portion of a result of the product-sum operation; and detecting a peak time based on the phase calculated.

Since the peak time detecting method of the second aspect performs the product-sum operation with respect to the input time-series signal by using the predetermined complex function, and does not perform a differential operation, the peak time detecting method is able to avoid false detection based on noises. As a result, the detection precision can be improved. Furthermore, since the determination of a peak time is performed based on the phase calculated based on the real number portion and the imaginary number portion of a result of the product-sum operation, the determination can be made immediately after an actual peak. Therefore, the method is able to detect a peak time quickly, in comparison with a method that determines a peak time when the signal becomes lower than a pre-set threshold. Furthermore, the arithmetic operations performed in the method are the product-sum operation with respect to the time-series signal, the phase calculation with respect to a result of the product-sum operation, etc, and can be quickly performed. Therefore, a peak time can be promptly detected.

In the peak time detecting method of the second aspect of the invention, a Gabor function may be used as the predetermined complex function, or a function that includes a real number portion having a localized waveform and an imaginary number portion having a localized waveform that is delayed by $\pi/2$ in phase from the real number portion may be used as the predetermined complex function. In the thus-constructed peak time detecting method of the invention, the peak time detecting step may be a step of detecting, as the peak time, a time point at which the phase calculated changes from $2\pi$ to zero.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
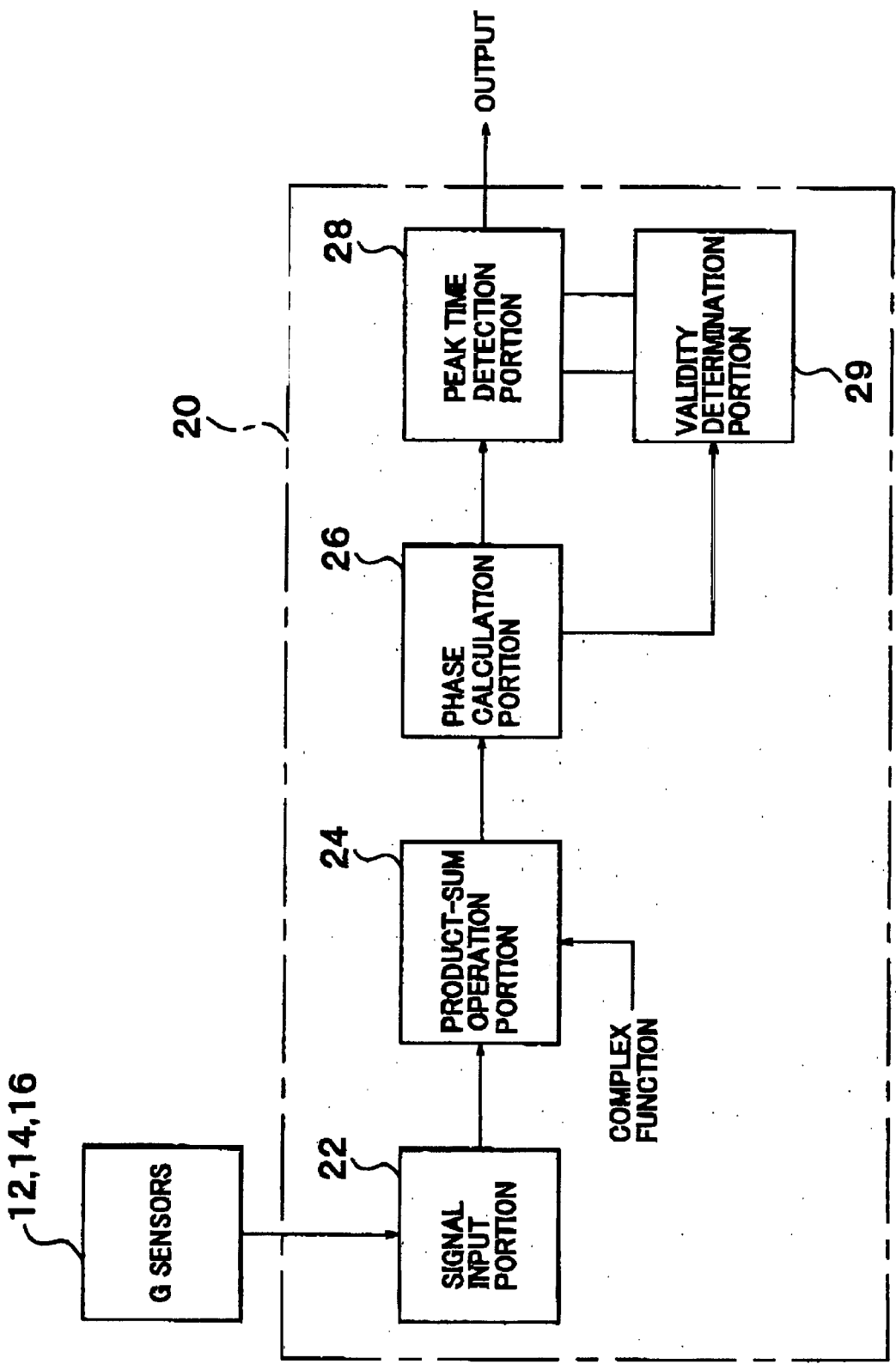
FIG. 1 is a functional block diagram schematically illustrating a construction of a peak time detecting apparatus in accordance with an embodiment of the invention that accepts input of signals from vehicle-installed G sensors.
Figure 2:
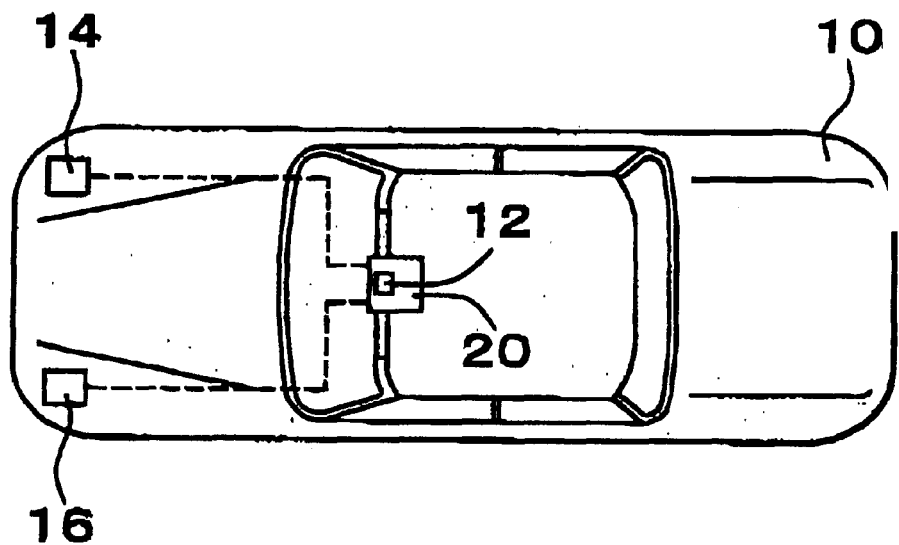
FIG. 2 illustrates an example of the installation of the. G sensors and the peak time detecting apparatus, of the embodiment in a vehicle.

Preferred embodiments of the invention will be described hereinafter with reference to the accompanying drawings. FIG. 1 is a function block diagram schematically illustrating a construction of a peak time detecting apparatus 20 in accordance with an embodiment of the invention that accepts input of signals from vehicle-installed G sensors 12, 14, 16 for detecting acceleration. FIG. 2 illustrates an example of the installation of the G sensors 12, 14, 16 and the peak time detecting apparatus 20 of the embodiment in a vehicle. The peak time detecting apparatus 20 of the embodiment is installed together with the G sensor 12 near a center console of the vehicle as shown in FIG. 2. As shown in FIG. 1, the peak time detecting apparatus 20 includes a signal input portion 22 for inputting detection signals from the G sensor 12 and the G sensors 14, 16 installed at forward right and left locations in the vehicle at a predetermined sampling timing, a product-sum operation portion 24 for performing a product-sum operation with respect to the input signal from each G sensor by using a complex function as a base of integral, a phase calculation portion 26 for calculating a phase of the real number portion and the imaginary number portion of a result of the product-sum operation, a peak time detection portion 28 for detecting a peak time of the signal based on the calculated phase, and a validity determination portion 29 for determining a validity of the peak time detected by the peak time detection portion 28, The G sensors 12, 14, 16 are installed in the vehicle for detecting a timing of activating a vehicle-installed occupant protecting apparatus, such as an airbag apparatus or the like. The peak time detecting apparatus 20 of this embodiment is used, for a processing prior to the determination of the road condition or the form of a crash (a frontal collision, a diagonal collision, an offset collision, etc.) based on signals obtained from the G sensors 12, 14, 16 when the vehicle runs on a rough road or crashes, and prior to the determination of the timing of activating the occupant protecting apparatus (for example, the airbag deploying speed of the airbag apparatus) and the fashion, of activating the apparatus (e.g., the airbag deploying speed in the case of an airbag apparatus). The first peak in the waveform of deceleration (negative acceleration) detected by each G sensor 12, 14, 16 during a crash of the vehicle is normally found when a bumper reinforcement disposed forward of side members of the vehicle yields to an impact, although this may not be the case depending on the form of the crash. The waveform detected by each G sensor 12, 14, 16 up to the proximity of the first peak often varies depending on the form of the crash, although this may not be the case depending on the configuration of the vehicle.

Figure 3:
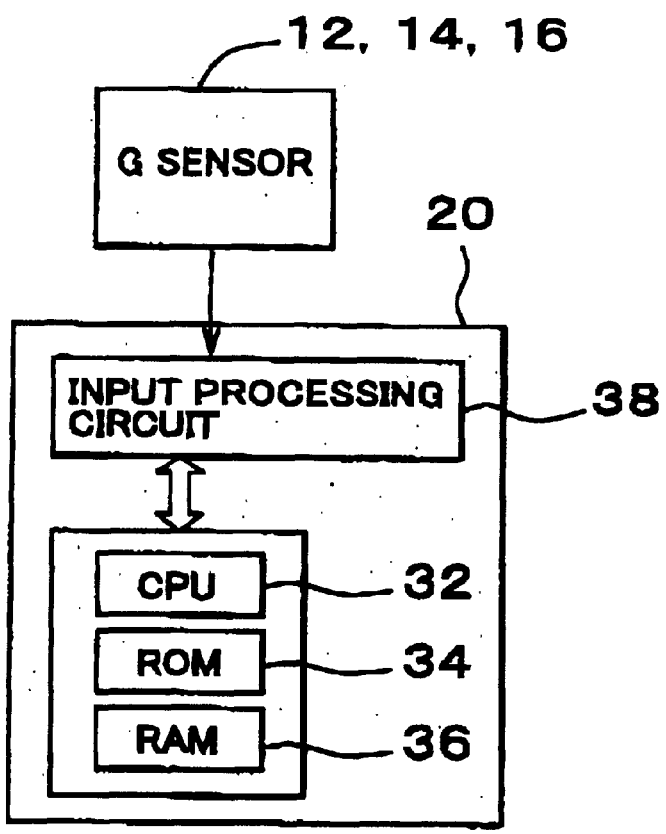
FIG. 3 is a diagram schematically illustrating a hardware construction of the peak time detecting apparatus of the embodiment.

In terms of a hardware construction, the peak time detecting apparatus 20 of this embodiment is formed as a microcomputer that includes a CPU 32 as a central component as shown in FIG. 3. The peak time detecting apparatus 20 further includes a ROM 34 storing processing programs, a RAM 36 for temporarily storing data, and an input processing circuit 38 that forms a portion of the signal input portion 22. The portions of the peak time detecting apparatus 20 of this embodiment exemplified in FIG. 1 function in a fashion in which the hardware and the software are integrated, when a processing program stored in the ROM 34 is started.

Next, operation of the peak time detecting apparatus 20 of this embodiment constructed as described above and, in particular, an operation of detecting a peak time from an input signal will be described together with the principle of the operation. First, the principle of detection of a peak of an input signal. The peak time detecting apparatus 20 of this embodiment detects a peak of a signal from each of the G sensors 12, 14, 16 and the time of the peak by using the wavelet transformation. The wavelet transformation X(a, b) of a time-series signal X(t) is a development as exemplified in equation (2) in which a pair of similar functions φa, b(t) obtained through an "a"-fold scale transformation of a basic wavelet function φ(t) localized in terms of time and frequency followed by a shift transformation (translational transfer) of the origin by "b" as expressed in equation (1) is a basis function. The scale transformation parameter "a" is proportional to the reciprocal of the frequency f. The scale transformation parameter "a" is proportional to the reciprocal of the frequency f.

$$\phi a, b(t) = a^{-\frac{1}{2}} \phi((t-b)/a) \quad (1)$$

$$X(a,b) = X(t)\phi a, b(t) \quad (2)$$

As for the basic wavelet function φ(t), the peak time detecting apparatus 20 of this embodiment uses a Gabor function as in equation (3), that is, a complex function where the imaginary number portion is π/2 shifted in phase from the real number portion. In equation (3) ωo is a constant determined by the frequency f (ωo=2πf), and α is another constant.

$$\phi(t) = \exp(-\alpha t^2 + i\,\omega o t) = \exp(-\alpha t^2) * (\cos(\omega o t) + i\sin(\omega o t)) \quad (3)$$

Figure 4:
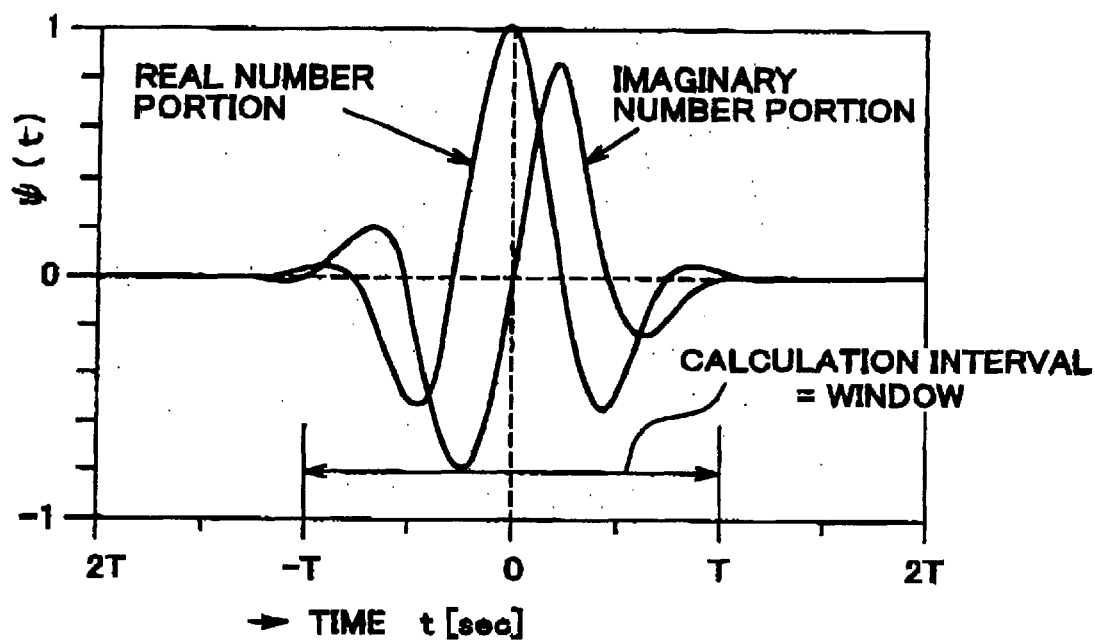
FIG. 4 is a diagram illustrating an example of the expression of a Gabor function on a time axis.

An expression of the Gabor function on the time axis where α=π in equation (3) is exemplified in FIG. 4. As indicated in FIG. 4, the Gabor function is localized within the range of −T to T on the time axis, and the waveforms of the real number portion and the imaginary number portion are π/2 shifted from each other. The wavelet transformation of the time-series signal X(t) is, specifically, a product-sum operation of the time-series signal X(t) and a function including a suitably selected scale transformation parameter "a" (ωo in equation (3)). The interval of the arithmetic operation is the range in which the waveform is localized (the range of −T to T in FIG. 4). This range will, be referred to as "window".

Figure 5:
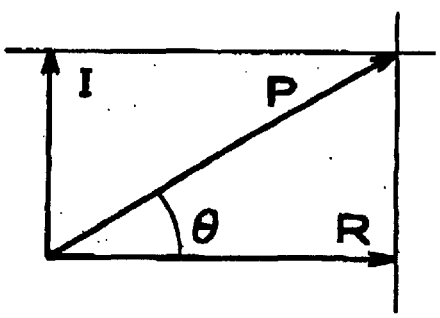
FIG. 5 is a diagram indicating a relationship among the real number portion R, the imaginary number portion I, the magnitude P and the phases θ of the wavelet transformation X(a, b)

The wavelet transformation X(a, b) of the time-series signal X(t) based on the Gabor function makes a complex number since the Gabor function is a complex function. FIG. 5 indicates a relationship among the real number portion R, the imaginary number portion I, the magnitude P and the phase θ of the wavelet transformation X(a, b) The magnitude P is calculated as in equation (4). The phase θ is determined by equation (5).

The magnitude P means an expedient magnitude of the wavelet transformation X(a, b), and is a non-dimensional quantity. The phase θ ranges between 0 and 2π depending on the magnitudes and signs of the real number portion R and the imaginary number portion I.

$$P = \sqrt{R^2 + I^2} \quad (4)$$

$$\theta = \tan^{-1}\left(\frac{I}{R}\right) \quad (5)$$

Figure 6:
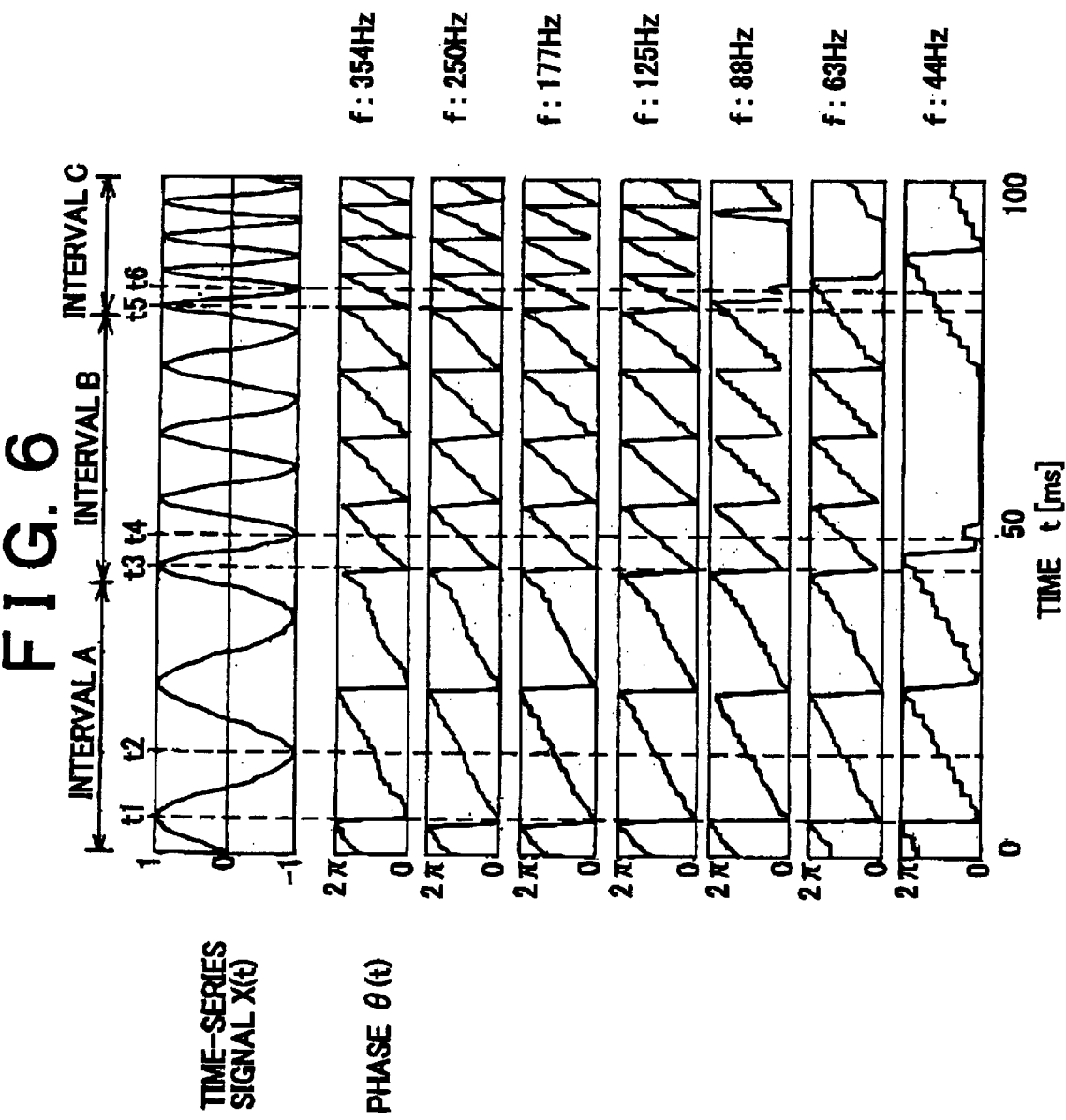
FIG. 6 is a diagram illustrating a relationship between the time-series signal X(t) and the phase θ(t) of the wavelet transformation X(a, b)

FIG. 6 is a diagram illustrating a relationship between the time-series signal X(t) and the phase θ(t) of the wavelet transformation X(a, b). In the diagram, the frequency of the time-series signal X(t) is 50 Hz in an internal A, 100 Hz in an interval B, and 200 Hz in an interval C. The sampling frequency of the time-series signal X(t) is 2 kHz. With regard to the phase θ(t), transformation frequencies f are set as follows. That is, a range of frequencies is set to 1.5 octaves above and below 1.25 Hz, and transformation frequencies f are set at increments of ½ octave within the range. The window width is set to twice the period T of each frequency f (T=1/f) Since the transformation frequency f and ωo in the Gabor function in equation (3) have a relationship of ωO=2πf as mentioned above, the product-sum operation for determining the phase θ(t) is an arithmetic operation using the Gabor function in equation (3) obtained by substitution of the constant ωo determined by the transformation frequency f with respect to the time-series signal X(t).

As indicated in the diagram of FIG. 6, the phase θ(t) of the transformation frequency f close to the frequency of the time-series signal X(t) changes from 2π to zero at time points (t1, t3, t5 in the diagram) when the amplitude of the time-series signal X(t) reaches a local maximum (peak). The phase θ(t) becomes π at time points (t2, t4, t6 in the diagram) when the amplitude reaches a local minimum (bottom). This is explained as follows. In the Gabor function expressed in equation (3), the waveform of the imaginary number portion I is π/2 shifted with respect to the waveform of the real number portion R as exemplified in FIG. 4. Let it assumed that the transformation frequency f is presently substantially equal to the frequency of the time-series signal X(t). When the amplitude of the time-series signal X(t) is maximum, the waveform of the time-series signal X(t) and the waveform of the, real number portion R of the Gabor function match in such a manner that they are substantially superimposed on each others and therefore the product-sum operation of the real number portion R provides a positive value. In contrast, the waveform of the imaginary number portion I, shifted by π/2, produces a value of zero through the product-sum operation. Therefore, the calculation of the phase θ based on equation (5) provides a value of 2π or zero. If suitable signs of the real number portion R and the imaginary number portion I in equation (3) are selected, the phase θ(t) will change from 2π to zero in the proximity of each maximum. When the amplitude of the time-series signal X(t) is minimum, the waveform of the time-series signal X(t) and the waveform of the real number portion R of the Gabor function superimpose in opposite signs, and therefore the product-sum operation of the real number portion R provides a negative value, and the product sum of the imaginary number portion I becomes "0". Therefore, the phase θ is calculated as 2π or zero in equation (5). With regard to the above-described relationship, it is not necessary that the frequency of the time-series signal X(t) and the wavelet transformation frequency f be perfectly equal, but a satisfactory result can be obtained if a frequency higher than or equal to a frequency close to the frequency of the time-series signal X(t) is set as a transformation frequency f, as can be understood from FIG. 6.

Figure 7:
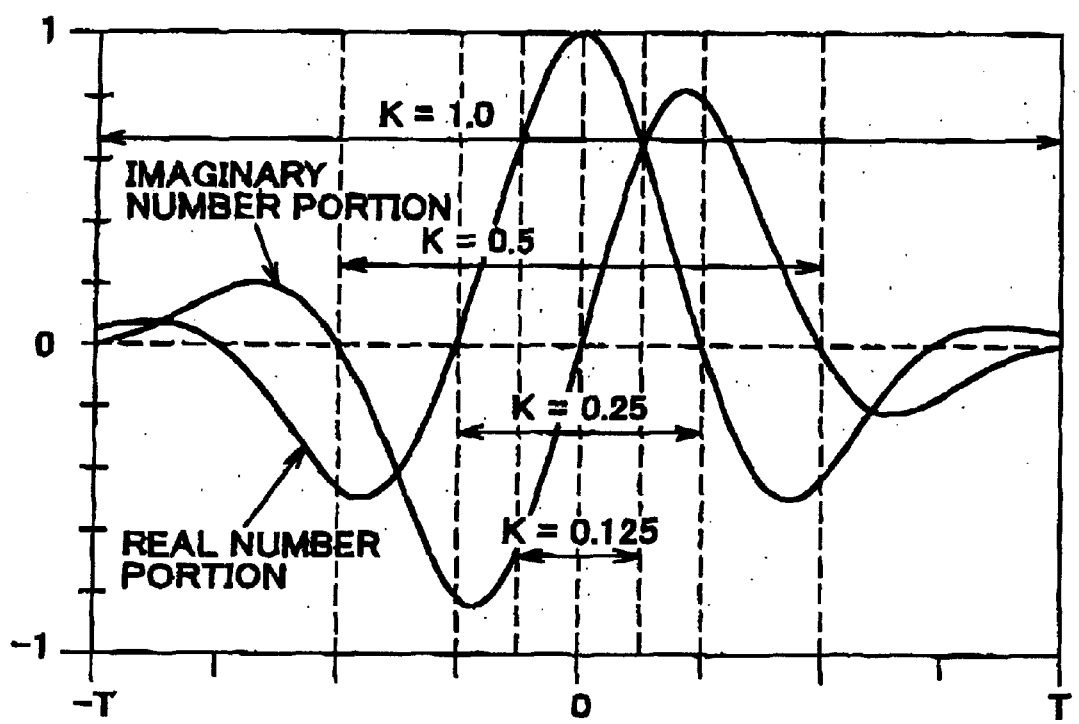
FIG. 7 is a diagram indicating a relationship between the window width and the window coefficient K.

A detection time delay td with respect to a peak time equals half the time that is needed for the arithmetic operation when the peak accords with the waveform of the real number portion R of the Gabor function (i.e., arithmetic operation interval), that is, the period T, as can be understood from the waveform shown in FIG. 4. For example, the transformation frequency f is 125 Hz, the detection time delay td is 8 msec. If detection of a peak time of the time-series signal X(t) is only the purpose, the arithmetic operation interval does not need to be set to the entire range of the window indicated in FIG. 4, but may be set to a reduced range centered at the peak of the waveform of the real number portion R. In this case, the ratio of the arithmetic operation interval to the width of the window is termed window coefficient K. FIG. 7 indicates a relationship between the window width and the window coefficient K. The detection time delay td and the window coefficient K have a relationship of td=K·T. For example, if the transformation frequency f is 125 Hz and the window coefficient K is 0.125, the detection time delay td is 1 msec. Thus, decreases in the window coefficient K decrease the detection time delay td, and decrease the amount of operation as well.

Figure 8:
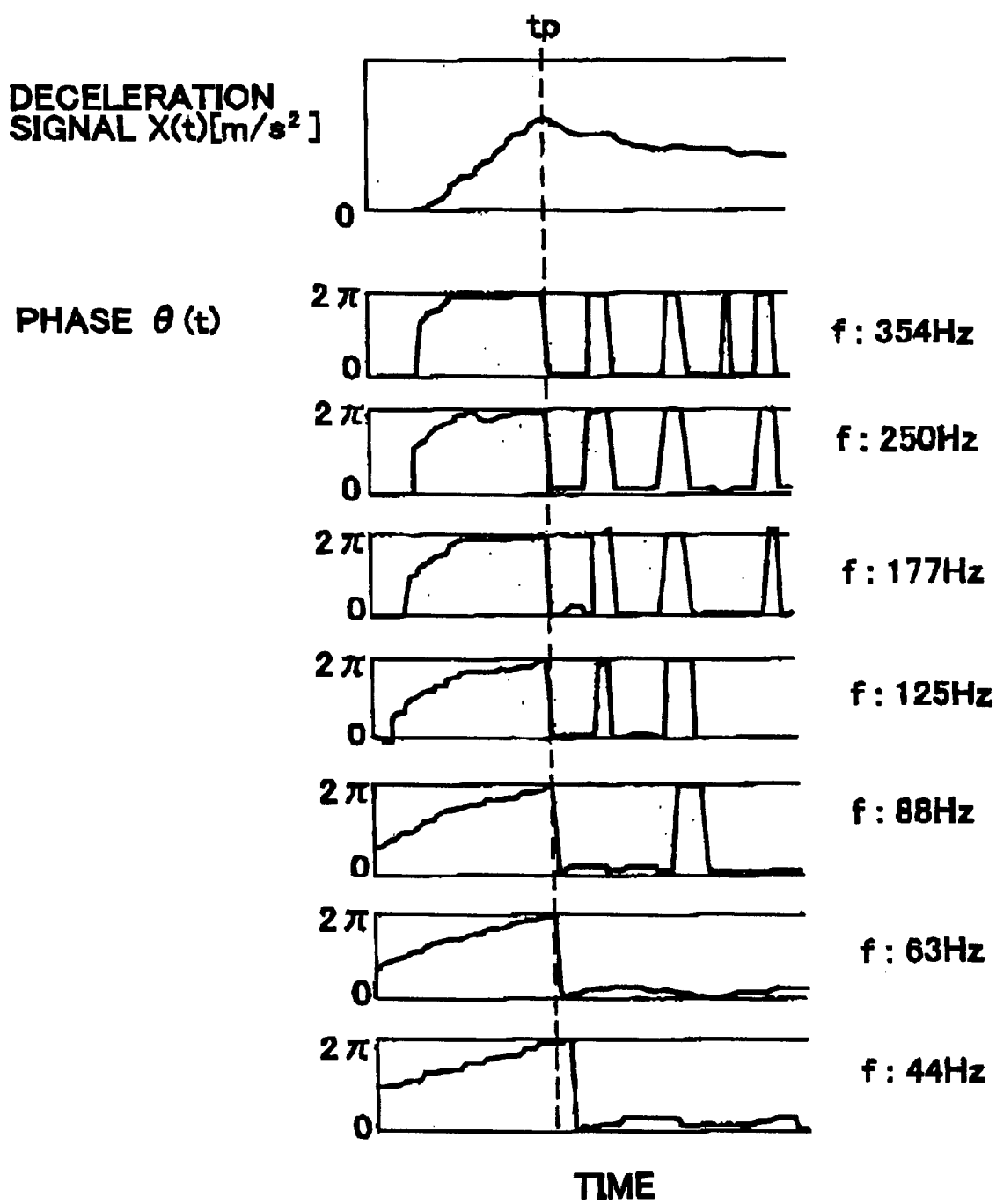
FIG. 8 is a diagram indicating a relationship between the phase θ(t) and the signal (deceleration signal) detected by a G sensor during a crash of the vehicle.
Figure 9:
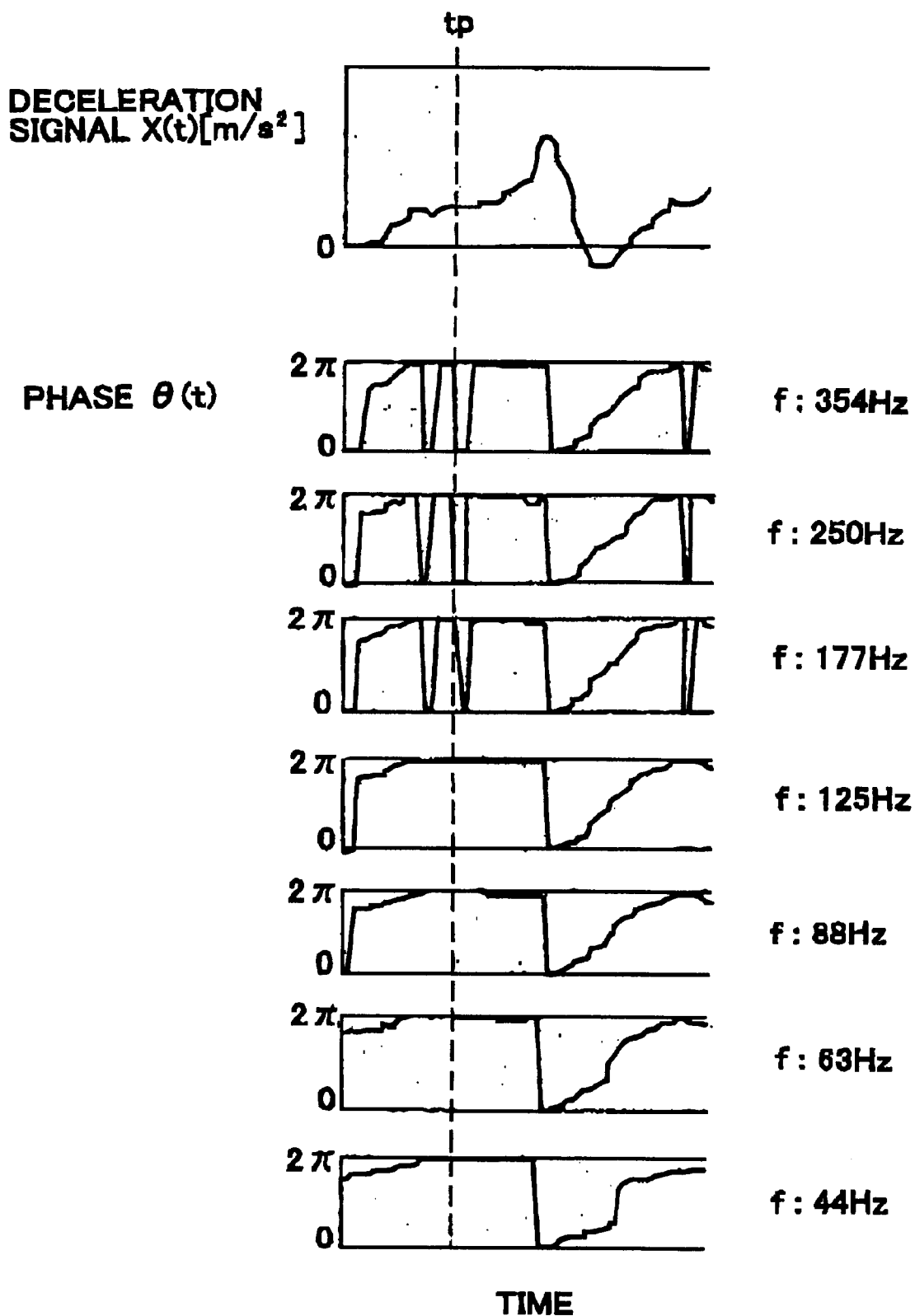
FIG. 9 is a diagram indicating a relationship between the phase θ(t) and the signal (deceleration signal) detected by the G sensor during a crash of the vehicle.

Next described will be selection of transformation frequencies f for signals from the G sensors 12, 14, 16, FIGS. 8 and 9 are diagrams each illustrating a relationship between the phase θ(t) and a signal detected by the G sensor 12 when the vehicle crashes i.e., deceleration signal). Normally, the deceleration signal X(t) exhibits various waveforms depending on the shape and construction of the vehicle, the form of crash, etc., and considerably contains high-frequency components due to vibrations of the vehicle. Therefore, high-frequency components are removed from signals from the G sensor 12 by using a Kalman filter, and a moving average value of high-frequency component-removed signals is determined as an input signal. As can be understood from FIGS. 8 and 9, the peak time detection becomes sensitive in phases θ(t) of relatively high transformation frequencies f, for example, the phases θ(t) of f=250 Hz and 354 Hz, in which peaks that cannot be considered as peaks are detected (see the right-hand side of the peak time tp in FIG. 8). In contrast, in phases θ(t) of relatively low transformation frequencies f, for example, the phases θ(t) of f=44 Hz and 63 Hz, the peak time detection becomes dull, and detection of a peak fails in some cases (see the peak time tp in FIG. 9) Therefore, it is desirable that transformation frequencies f be set through crash tests and the like using vehicles equipped with peak time detecting apparatuses 20. As can be seen from FIGS. 8 and 9, a transformation frequency f of about 100 to 150 Hz is considered appropriate for passenger vehicles.

The principle of detection of a peak time of the time-series signal X(t) based on the phase θ(t) and the selection of a window coefficient K and a transformation frequency f have been described. The peak time detecting apparatus 20 of this embodiment is able to detect a peak time of a signal from each of the G sensors 12, 14, 16 by forming a time-series signal X(t) from the signal from each of the G sensors 12, 14, 16; and by using a transformation frequency f set through a vehicle crash test or the like. The peak time detecting apparatus 20 of the embodiment samples the signal from each G sensor 12, 14, 16 at a sampling frequency of 2 kHz, and performs a Kalman filter process on the sampled signals to remove high-frequency components, and performs a moving average process using ten sample values, thereby forming a deceleration signal X(t). The product-sum operation portion 24 performs, for peak detection, a product-sum operation of the deceleration signal X(t) from the signal input portion 22 by using the Gabor function of equation (3) based on the transformation frequency f being set to 125 Hz and setting the window coefficient K to 0.125. Furthermore, for validity determination, the product-sum operation portion 24 performs a product-sum operation of the deceleration signal X(t) by setting the transformation frequency f to 200 Hz. The validity determination will be described below. After that, the phase calculation portion 26 calculates a phase θ from the real number portion R and the imaginary number portion I of the result of the product-sum operation, that is, the wavelet transformation X(a, b), as in equation (5). The peak time detection portion 28 then detects a time at which the phase θ changes from 2π to zero and determines the time as a peak time and outputs the peak time.

The determination regarding the validity of the peak time will be described. As described above with reference to FIGS. 8 and 9, increases in the transformation frequency f increase the peak time detection sensitivity, and decreases in the transformation frequency f decrease the peak time detection sensitivity. Even if a more precise transformation frequency f is set through a crash test, it is not ensured that reliable peak detection is possible with respect to all the crash deceleration waveforms. For example, in FIG. 9, the peak time tp is detected if the transformation frequency f is 177 Hz or higher, but the peak time is not detected if the transformation frequency f is 125 Hz. Therefore, it is possible to determine whether a peak time tp has gone undetected or to determine whether a detected peak time tp is valid, by comparing a result obtained by using a transformation frequency f set through an experiment or the like (hereinafter, referred to as "detection-purposed transformation frequency fp") with a result obtained by using a transformation frequency f ("determination-purposed transformation frequency fj") that is about 1.2 to 2.0 times the detection-purposed transformation frequency fp. That is, if a peak time tp is not detected in the result obtained by using the detection-purposed transformation frequency fp whereas a peak time tp is detected in the result obtained by using the determination-purposed transformation frequency fj, it can be determined that the detection of a peak time tp is uncertain. If a peak time tp is detected in both the result obtained by using the detection-purposed transformation frequency fp and the result obtained by using the determination-purposed transformation frequency fj, it can be determined that the detected peak time tp is valid. The validity determination portion 29 of the peak time detecting apparatus 20 of this embodiment receives the phase θ calculated by the phase calculation portion 26 based on the result of the product-sum operation performed by the product-sum operation portion 24 using 200 Hz as a determination-purposed transformation frequency fj. Then, the validity determination portion 29 detects a peak time similarly to the peak time detection portion 28, and receives the peak time detected by the peak time detection portion 28, and determines the validity of the detected peak time, and outputs the result of determination to the peak time detection portion 28. The peak time detection portion 28 outputs a detected peak time if the result of the determination is "valid". If the result of the determination is "invalid", the peak time detection portion 28 outputs a signal indicating that a peak time is not detected.

Figure 10:
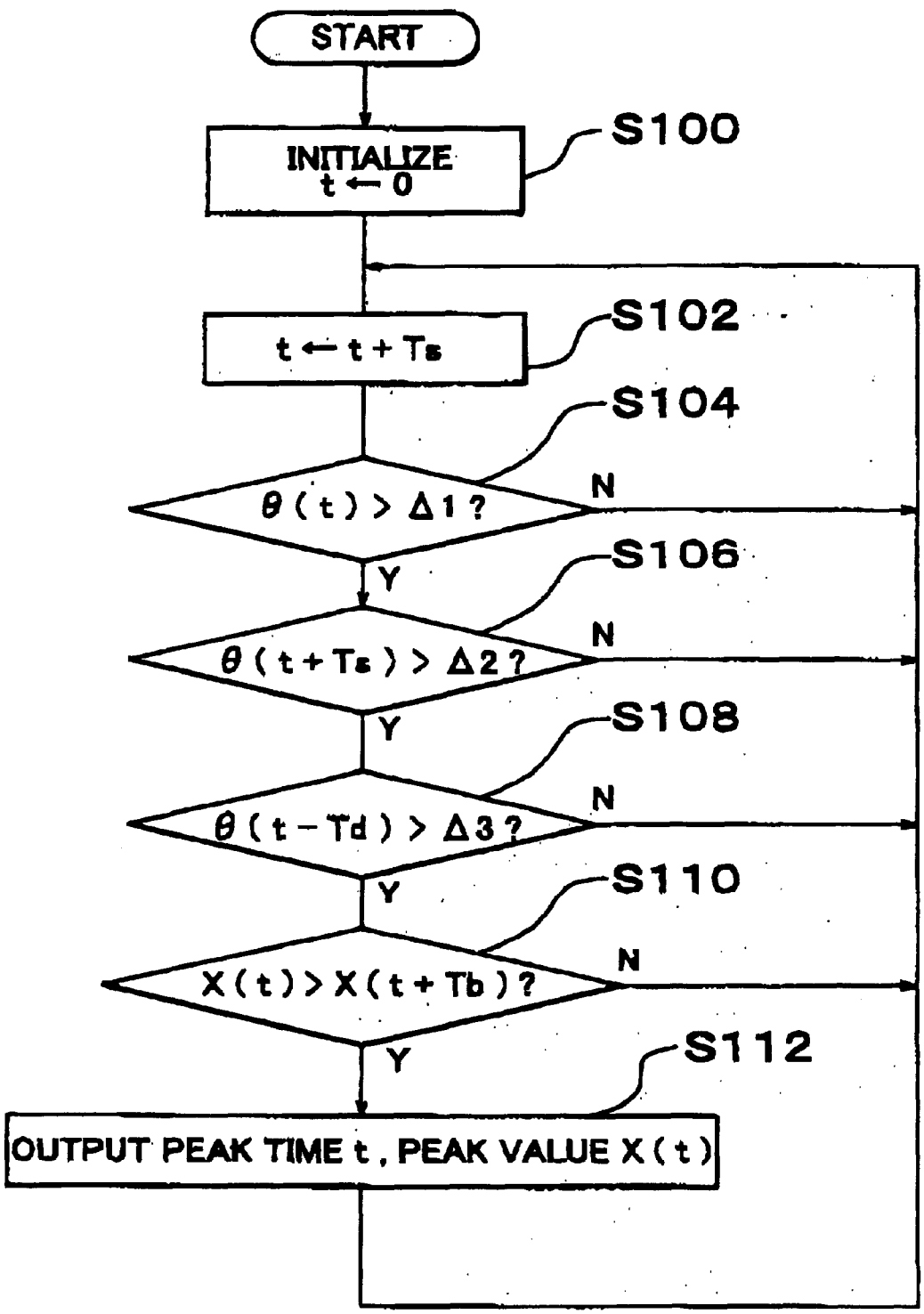
FIG. 10 is a flowchart illustrating a peak time detecting process routine executed by the peak time detecting apparatus.

The above-described detection of a peak time is performed by executing a peak detecting process routine exemplified in FIG. 10. This routine is executed with respect to both the phase θp(t) as a result of the detection-purposed transformation frequency fp and the phase θj(t) as a result of the determination-purposed transformation frequency fj. The routine is started when the signal detected by the G sensor 12 exceeds a value, for example, 2G, 3G or the like.

When the peak detection process routine is executed, the CPU 32 first assigns a value "0" to the time t as an initializing process (step S100), and increments the time t by a sampling time Ts(step S102). Subsequently, the CPU 32 determines whether the phase θ(t) is greater than a predetermined value Δ1, and determines whether a phase θ(t+Ts) is smaller than a predetermined value Δ2 (steps S104, S106). Since the detection of a peak time is the detection of a time at which the phase θ changes from 2π to zero as mentioned above, the detection can be accomplished by determining whether such a phase change is present between a time point t and a time point "t+TS". Therefore, taking this into account, the predetermined value Δ1 and the predetermined value Δ2 are pre-set. In this embodiment, the predetermined value Δ1 is "2π−1", and the predetermined value Δ2 is "2π−2".

If the phase θ(t) is at most Δ1, or, if the phase θ(t+Ts) is at least Δ2, the CPU 32 returns to step S102, determining that there is no peak. Conversely, it the phase θ(t) is greater than Δ1 and the phase θ(t+Ts) is less than Δ2, the CPU 32 then determines whether the phase θ(t−Td) is greater than a predetermined value Δ3 (step S108). In the phase θ(t−Td), Td, is a predetermined length of time. In this embodiment, Td is set to three times the sampling time Ts(Td=3Ts). This processing of determining whether the peak at the time point t is a phase greater than the predetermined value Δ3 at the predetermined length of time prior to the time point t is provided for determining whether the peak at the time point t is a clear peak. In this embodiment, the predetermined value Δ3 is π.

Figure 11:
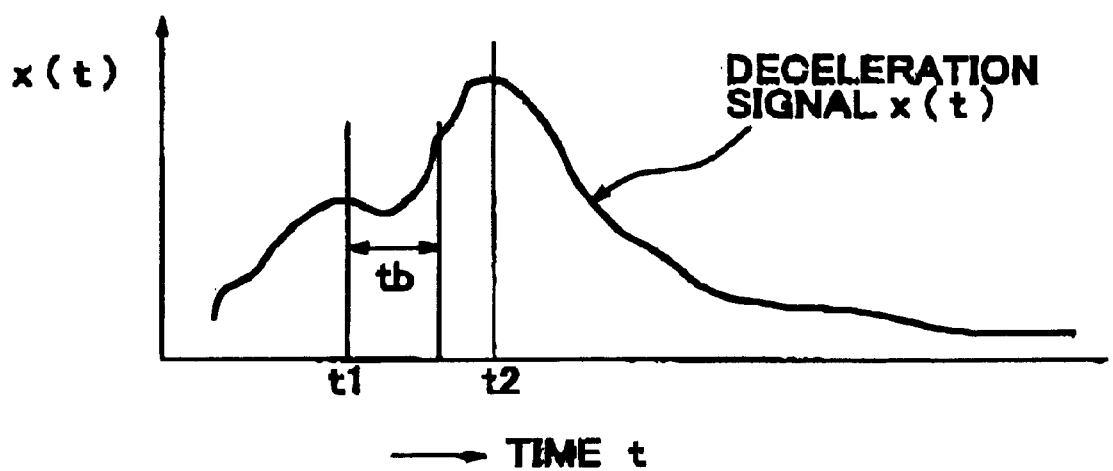
FIG. 11 is a diagram illustrating a process performed when successive peak times are detected.

If the phase θ(t−Td) is at most the predetermined value Δ3, the CPU 32 determines that the peak at the time point t is not a clear peak, and returns to step S102. If the phase θ(t−Td) is greater than the predetermined value Δ3, the CPU 32 determines that the peak at the time point t is a clear peak. Then, the CPU 32 determines whether the value occurring at the time point t, that is, the peak value X(t), is greater than the value X(t+Tb) occurring at the elapse of a time Tb after the time point t(step S110). In the value X(t+Tb), Tb is a predetermined length of time. This processing is a processing for detecting a greater peak if the deceleration signal exhibits successive peaks. FIG. 11 indicates a case where peaks are successively detected. If, as indicated in FIG. 11, the deceleration signal X(t) has successive peaks at a time point t1 and a time point t2 and the peak value X(t1) is less than the value X(t+Tb) the peak at the time point t1 is not determined as a peak, but the peak at the time point t2 is determined as a peak. In this embodiment, Tb is set to 10 times the sampling time Ts(Tb=10Ts).

If the peak value X(t) is less than or equal to the value X(t+Tb), the CPU 32 determines that a greater peak immediately follows, and returns to step S102. If the peak value X(t) is greater than the value X(t+Tb), the CPU 32 determines that the peak at the time point t is a peak to be detected, and then outputs the peak time t and the peak value X(t) (step S112), Subsequently, the CPU 32 returns to step S102.

Through the above-described processing, it is possible to detect the time point of a greater peak and the value of the peak if the signal has successive clear peaks.

Figure 12:
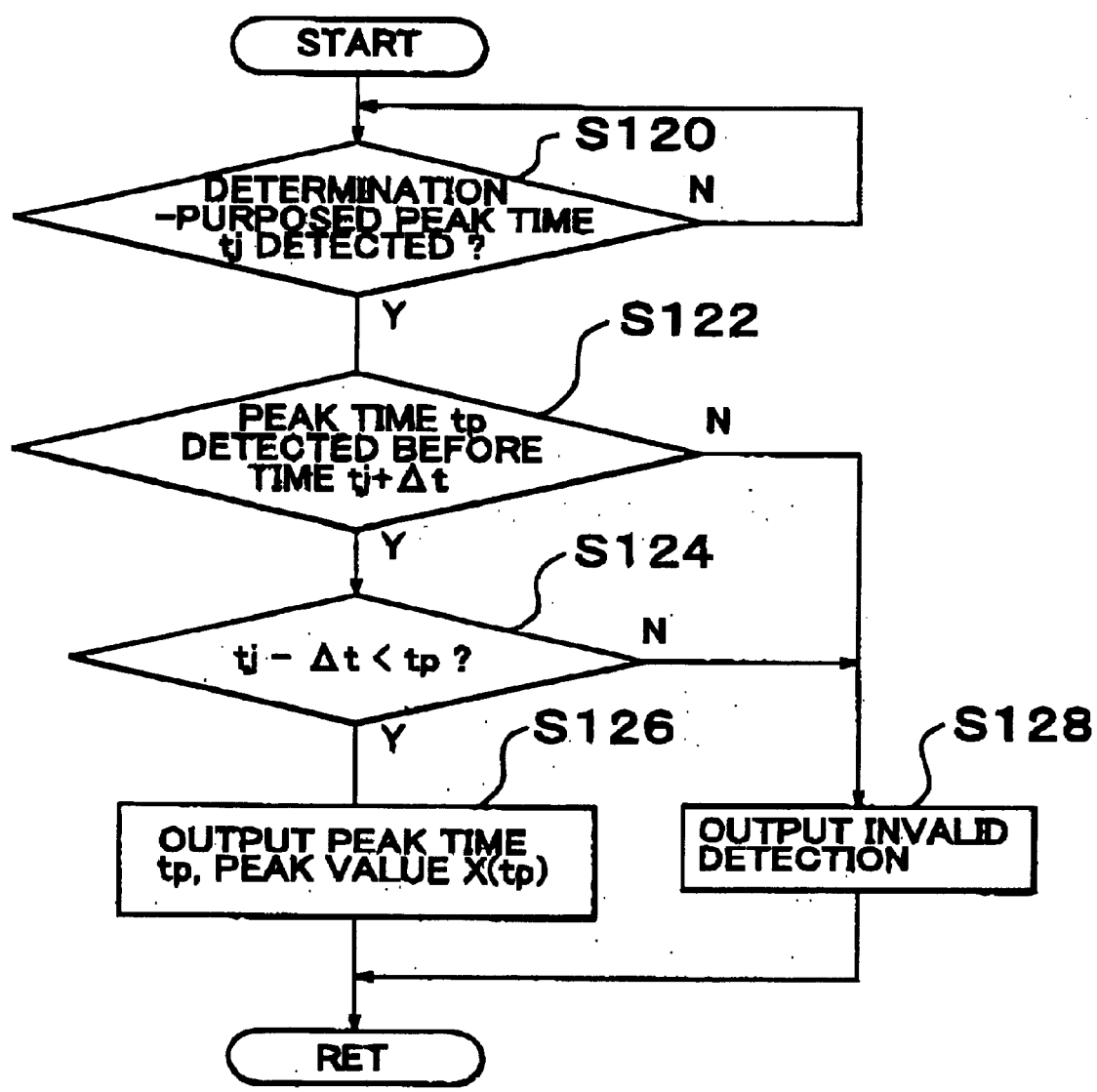
FIG. 12 is a flowchart illustrating a peak time validity determining process routine executed by the peak time detecting apparatus.

The peak time detecting apparatus 20 of this embodiment determines validity of the peak time tp by using the peak time tp with respect to the phase θp(t) as a result of the detection-purposed transformation frequency fp and the peak time tj with respect to the phase θj(t) as a result of the determination-purposed transformation frequency fj in the peak detecting process routine of FIG. 10. FIG. 12 is a flowchart illustrating a peak time validity determining process routine executed by the peak time detecting apparatus 20. When this routine is executed, the CPU 32 first waits for detection of a peak time tj with respect to the phase θj(t) as the result of the determination-purposed transformation frequency fj (step 120), and then determines whether a peak time tp with respect to the phase θp(t) as the result of the detection-purposed transformation frequency fp is detected before the elapse of a time Δt following the peak time tj (step S122). If a peak time tp is detected so, the CPU32 determines whether the time of the detected peak time tp is after a time point determined by subtracting the time Δt from the determination-purposed peak time tj (step S124). That is, the processing of steps, S122 and S124 is a process of determining whether a peak time tp is detected within the time range of ±Δt from the determination-purposed peak time tj. As described above with reference to FIGS. 6 and 9, the determination-purposed transformation frequency fj is higher than the detection-purposed transformation frequency fp, and provides a higher sensitivity for peak time detection. Therefore, the determination-purposed transformation frequency fj allows more peak times to be detected than the detection-purposed transformation frequency fp. Although the detection-purposed transformation frequency fp is pre-set so as to match the vehicle through experiments and the like, a real crash is not necessarily the same as a test crash. Therefore, the waveform of the deceleration signal X(t) cannot be singularly determined, and a peak time may go undetected in some cases. The above-described processing is able to determine whether a peak time has gone undetected. The time Δt may be set as an allowable value of deviation between the detection of a peak time tj based on the determination-purposed transformation frequency fj and the detection of a peak time tp based on the detection-purposed transformation frequency fp, and may be determined in accordance with the sampling time, the characteristic of the deceleration signal X(t), etc. In this embodiment, the time Δt is 2 msec.

If a peak time tp is detected between ±Δt from the determination-purposed peak time tj, the CPU 32 determines that the peak time is valid, and outputs the peak time tp and the peak value X(tp) as results (step S126). Then, the CPU 32 ends this routine. Conversely, if no peak time tp is detected between ±Δt from the determination-purposed peak time tj, the CPU 32 determines that the peak time is invalid or undetected, and produces an output indicating invalid detection (e.g., sets a flag) (step S126). After that, the CPU 32 ends this routine.

The peak time tp and the peak value X(tp) detected as described above or the output indicating invalid detection are used in processes afterwards, for example, a process of determining a form of crash, a process of starting an occupant protection apparatus, etc. Such processes are not a gist of the invention, and will not be described any further.

The above-described peak time detecting apparatus 20 of the embodiment is able to detect a peak time and a peak value of the signal from each of the G sensor 12, 14, 16. Furthermore, since the wavelet transformation is employed, the peak time detecting apparatus 20 is able to promptly accomplish the detection of a peak time within a short time following the peak time. Still further, since the peak time detection does not employ a differential operation but employs the product-sum operation, false detection of a peak time due to noises can be prevented. Further, since it is determined whether a peak time is valid or undetected, a highly reliable peak time can be acquired, and makes processes afterwards more precise.

The peak time detecting apparatus 20 of this embodiment performs the processing of step S108 in the peak, time detecting process routine exemplified in FIG. 10 in order to detect a peak time of a clear peak. Furthermore, in order to acquire a peak time of a greater peak value if the deceleration signal X(t) has successive peaks, the peak time detecting apparatus 20 performs the processing of step S110 in the peak time detecting process routine. However, the processing of step S108 and the processing of step S110 may be omitted if all peak times are acquired. It is also possible to perform only one of the processing of step S108 and the processing of step S110.

Although the peak time detecting apparatus 20 of the embodiment determines whether a peak time is undetected or valid, the determination regarding validity may be omitted. In such a case, the validity determination portion 29 shown in FIG. 1 becomes unnecessary, and the processing performed by the product-sum operation portion 24 and the product-sum operation portion 24 based on the determination-purposed transformation frequency fj also become unnecessary.

Furthermore, the peak time detecting apparatus 20 of this embodiment performs the Kalman filter process or the moving average process as a pre-process for the product-sum operation in order to remove high-frequency components from the signals from the G sensors 12, 14, 16. However, since these processes depend on the characteristic of the input time-series signal, it in also possible to omit these processes as a pre-process for the product-sum operation or replace the processes with other processes depending on the input time-series signal.

Although the peak time detecting apparatus 20 of the embodiment detects a peak time of the signal from each G sensor 12, 14, 16, the embodiment is not limited to the detection regarding the signals from the G sensors 12, 14, 16, but is applicable to detection of a peak time of any time-series signal. In such an application, the transformation frequency f may be suitably selected in accordance with the characteristic of the time-series signal.

While the present invention has been described with reference to what is presently considered to be a preferred embodiment thereof, it is to be understood that the invention is not limited to the disclosed embodiment or constructions. To the contrary, the invention can be embodied in various forms without departing from the spirit of the invention.

What is claimed is:

1. A peak time detecting apparatus for detecting a peak time of a time-series signal by using a wavelet transformation, comprising:

signal input means for inputting the time-series signal;

product-sum operation means for performing a product-sum operation with respect to the time-series signal inputted, by using a predetermined complex function as an integral base;

phase calculation means for calculating a phase based on a real number portion and an imaginary number portion of a result of the product-sum operation; and peak time determination means for determining a peak time of the time-series signal based on the phase calculated, wherein the product-sum operation means is means that uses a Gabor function as the predetermined complex function.

2. A peak time detecting apparatus according to claim 1, wherein the peak time determination means is means for determining, as the peak time, a time point at which the phase calculated by the phase calculation means changes from $2\pi$ to zero.

3. A peak time detecting apparatus for detecting a peak time of a time-series signal by using a wavelet transformation, comprising:

signal input means for inputting the time-series signal;

product-sum operation means for performing a product-sum operation with respect to the time-series signal inputted, by using a predetermined complex function as an integral base;

phase calculation means for calculating a phase based on a real number portion and an imaginary number portion of a result of the product-sum operation; and peak time determination means for determining a peak time of the time-series signal based on the phase calculated, wherein the product-sum operation means is means that uses, as the predetermined complex function, a function that includes a real number portion having a localized waveform and an imaginary number portion having a localized waveform that is delayed by $\pi/2$ in phase from the real number portion.

4. A peak time detecting apparatus according to claim 3, wherein the peak time determination means is means for determining, as the peak time, a time point at which the phase calculated by the phase calculation means changes from $2\pi$ to zero.

5. A peak time detecting apparatus for detecting a peak time of a time-series signal by using a wavelet transformation, comprising:

signal input means for inputting the time-series signal;

product-sum operation means for performing a product-sum operation with respect to the time-series signal inputted, by using a predetermined complex function as an integral base;

phase calculation means for calculating a phase based on a real number portion and an imaginary number portion of a result of the product-sum operation; and peak time determination means for determining a peak time of the time-series signal based on the phase calculated; and validity determination means for determining a validity of a result of determination made by the peak time determination means.

6. A peak time detecting apparatus according to claim 5, wherein the phase calculation means is means for calculating a phase regarding a result of the product-sum operation with respect to a peak time detection-purposed transformation frequency and a phase regarding a result of the product-sum operation with respect to a validity determination-purposed transformation frequency that is higher than the peak time detection-purposed transformation frequency, and wherein the validity determination means is means for determining the validity based on the phase calculated regarding the result with respect to the validity determination-purposed transformation frequency.

7. A peak time detecting apparatus according to claim 6, wherein the validity determination means is means for determining that a valid determination is made if a peak time is determined within a predetermined time before and after a time point at which the phase calculated regarding the result with respect to the validity determination-purposed transformation frequency changes from $2\pi$ to zero.

8. A peak time detecting apparatus according to claim 6, wherein the validity determination-purposed transformation frequency is 1.0 to 2.0 times the peak time detection-purposed transformation frequency.

9. A peak time detecting apparatus for detecting a peak time of a time-series signal by using a wavelet transformation, comprising:

signal input means for inputting the time-series signal;

product-sum operation means for performing a product-sum operation with respect to the time-series signal inputted, by using a predetermined complex function as an integral base;

phase calculation means for calculating a phase based on a real number portion and an imaginary number portion of a result of the product-sum operation; and peak time determination means for determining a peak time of the time-series signal based on the phase calculated, wherein the time-series signal is a signal formed by removing a high-frequency component from a signal detected by deceleration detection means provided in a vehicle, and wherein the phase calculation means is means for calculating a phase regarding a result of the product-sum operation with respect to a predetermined transformation frequency within a range of 100 to 150 Hz.

10. A peak time detecting method for detecting a peak time of an input time-series signal by using a wavelet transformation, comprising:

performing a product-sum operation with respect to the input time-series signal by using a predetermined complex function as an integral base;

calculating a phase based on a real number portion and an imaginary number portion of a result of the product-sum operation; and detecting a peak time based on the phase calculated, wherein a Gabor function is used as the predetermined complex function.

11. A peak time detecting method according to claim 10, wherein the peak time detecting step is a step of detecting, as the peak time, a time point at which the phase calculated changes from $2\pi$ to zero.

12. A peak time detecting method for detecting a peak time of an input time-series signal by using a wavelet transformation, comprising:

performing a product-sum operation with respect to the input time-series signal by using a predetermined complex function as an integral base;

calculating a phase based on a real number portion and an imaginary number portion of a result of the product-sum operation; and detecting a peak time based on the chase calculated, wherein a function that includes a real number portion having a localized waveform and an imaginary number portion having a localized waveform that is delayed by $\pi/2$ in phase from the real number portion is used as the predetermined complex function.

13. A peak time detecting method according to claim 12, wherein the peak time detecting step is a step of detecting, as the peak time, a time point at which the phase calculated changes from $2\pi$ to zero.

14. A peak time detecting method for detecting a peak time of an input time-series signal by using a wavelet transformation, comprising:

performing a product-sum operation with respect to the input time-series signal by using a predetermined complex function as an integral base;

calculating a phase based on a real number portion and an imaginary number portion of a result of the product-sum operation;

detecting a peak time based on the phase calculated; and determining a validity of a result of determination made by the peak time detecting step.

15. A peak time detecting method according to claim 14, wherein the phase calculating step is a step of calculating a phase regarding a result of the product-sum operation with respect to a peak time detection-purposed transformation frequency and a phase regarding a result of the product-sum operation with respect to a validity determination-purposed transformation frequency that is higher than the peak time detection-purposed transformation frequency, and wherein the validity determining step determines the validity based on the phase calculated regarding the result with respect to the validity determination-purposed transformation frequency.

16. A peak time detecting method according to claim 15, wherein the validity determining step determines that a valid determination is made if a peak time is determined within a predetermined time before and after a time point at which the phase calculated regarding the result with respect to the validity determination-purposed transformation frequency changes from $2\pi$ to zero.

17. A peak time detecting method according to claim 15, wherein the validity determination-purposed transformation frequency is 1.0 to 2.0 times the peak time detection-purposed transformation frequency.

18. A peak time detecting method for detecting a peak time of an input time-series signal by using a wavelet transformation, comprising:

performing a product-sum operation with respect to the input time-series signal by using a predetermined complex function as an integral base;

calculating a phase based on a real number portion and an imaginary number portion of a result of the product-sum operation; and detecting a peak time based on the phase calculated, wherein the time-series signal is a signal formed by removing a high-frequency component from a signal detected by deceleration detection means provided in a vehicle, and wherein the phase calculating step calculates a phase regarding a result of the product-sum operation with respect to a predetermined transformation frequency within a range of 100 to 150 Hz.

* * * * *